United States Patent
Eireos Garcia (10) Patent No.: US 8,727,372 B2
(45) Date of Patent: May 20, 2014

(54) FASTENING DEVICE FOR AN AIRBAG MODULE

(75) Inventor: Fernando Jose Eireos Garcia, Vigo (ES)

(73) Assignee: Dalphi Metal Espana S.A., Madrid (ES)

( * ) Notice: Subject to any disclaimer, the term of this patent is extended or adjusted under 35 U.S.C. 154(b) by 0 days.

(21) Appl. No.: 13/988,791

(22) PCT Filed: Nov. 30, 2011

(86) PCT No.: PCT/EP2011/005988
§ 371 (c)(1),
(2), (4) Date: Jun. 12, 2013

(87) PCT Pub. No.: WO2012/072241
PCT Pub. Date: Jun. 7, 2012

(65) Prior Publication Data
US 2013/0285354 A1    Oct. 31, 2013

(30) Foreign Application Priority Data
Dec. 1, 2010  (DE) ............... 20 2010 016 004 U (51) Int. Cl.
*B60R 21/16* (2006.01)

(52) U.S. Cl.
USPC ..................... 280/728.2; 280/731

(58) Field of Classification Search
USPC ............................. 280/731, 728.2
See application file for complete search history.

(56) References Cited

U.S. PATENT DOCUMENTS

| | | | |
|---|---|---|---|
| 6,237,944 B1 * | 5/2001 | Worrell et al. ............... | 280/731 |
| 6,325,408 B1 * | 12/2001 | Ford ........................... | 280/728.2 |
| 7,059,631 B2 * | 6/2006 | Schorle et al. ............... | 280/731 |
| 7,185,915 B2 * | 3/2007 | Fujita et al. .................. | 280/731 |
| 7,264,266 B2 * | 9/2007 | Erlingstam et al. ......... | 280/728.2 |
| 7,469,921 B2 * | 12/2008 | Burgard et al. .............. | 280/728.2 |
| 7,533,897 B1 * | 5/2009 | Xu et al. ..................... | 280/728.2 |
| 7,566,071 B2 * | 7/2009 | Tsujimoto et al. ........... | 280/731 |
| 2004/0169358 A1 | 9/2004 | Fujita et al. | |
| 2005/0217413 A1 | 10/2005 | Specht et al. | |
| 2011/0089672 A1 | 4/2011 | Nebel et al. | |

FOREIGN PATENT DOCUMENTS

| | | |
|---|---|---|
| DE | 296 21 295 | 3/1997 |
| DE | 299 08 967 | 12/1999 |
| DE | 10 2008 028 1216 | 12/2009 |
| EP | 1 314 620 | 5/2003 |
| EP | 1 705 075 | 9/2006 |
| EP | 2 145 801 | 1/2010 |
| EP | 2 213 523 | 8/2010 |

\* cited by examiner

*Primary Examiner* — Faye M. Fleming
(74) *Attorney, Agent, or Firm* — Tarolli, Sundheim, Covell & Tummino LLP (57) ABSTRACT

A device for fastening an airbag module in a vehicle comprises a first part, in particular a steering wheel insert (28), with a latching hook (30), and a second part, in particular a baseplate (10) of the airbag module, with a passage opening (14) for the latching hook (30) and with a holder (16) for a spring element (18). The device furthermore comprises a spring element (18) with a bearing section (22) and an elastically deflectable retaining section (24). The spring element (18) is held in the holder (16) in such a manner that the retaining section (24) is transferable from a starting position into a deflecting position, which permits the latching hook (30) to be guided through the passage opening (14), and into a retaining position, in which the retaining section (24) presses against a retaining surface (40) of the latching hook (30). By contrast, the bearing section (22) is held substantially immovably in the holder (16).

13 Claims, 10 Drawing Sheets

FASTENING DEVICE FOR AN AIRBAG MODULE

RELATED APPLICATIONS

This application corresponds to PCT/EP2011/005988, filed Nov. 30, 2011, which claims the benefit of German Application No. 20 2010 016 004.0, filed Dec. 1, 2010, the subject matter, of which are incorporated herein by reference in their entirety.

BACKGROUND OF THE INVENTION

The invention relates to a device for fastening an airbag module in a vehicle.

For fastening airbag modules a plurality of different spring detent systems are known in which a latching hook formed at the airbag module or at the steering wheel is secured against falling out by means of a detent spring disposed at the steering wheel or at the airbag module. In all these systems—DE 299 08 967 is cited by way of example—the spring made of round spring wire having a minimum diameter of about 2-3 mm is bent so as to be capable of withstanding the forces upon release of the airbag and of safely holding the module at the steering wheel.

Springs of this type have the drawback, however, that during assembly the module can be pressed into its acceptance at the steering wheel only with considerable effort so as to press the spring arms out of their idling condition into a position in which the latching hooks can bypass them to get into their mounting position. This requires additional checks as to whether all latching hooks are correctly engaged.

In order to overcome these drawbacks when assembling airbag modules with such conventional wire springs, applicant's EP 2 145 801 A1 suggested a generic fastening device. Instead of the round wire spring, a U-shaped spring made of flat iron being movably supported on a plate and having two parallel especially long arms was suggested. The freedom of movement of the spring was limited, on the one hand, by bridge-like elements and, on the other hand, by pins so that when inserting the latching hook through a passage opening of the plate initially the entire spring performed a rotation and subsequently either of the arms was deflected. By displacing the spring as a whole in its holder (without compressing the latter) the individual relatively long spring arm provided for engaging a latching hook then had to be deflected to a small extent only. In this way the effort of assembling the airbag module could already be considerably reduced.

However, with this type of fastening an unhindered low-friction mobility of the spring on the plate had to be ensured, in particular the spring had to be adapted to be rotated as a whole during assembly; therefore play had to be provided. Moreover tolerance limits have to be strictly observed in the dimensions and the arrangement of the passage opening, the bridge-like elements and the pins relative to each other as well as in the shape of the spring (bending) so as to prevent the risk of jamming of the spring, especially before engagement. This entailed an expensive manufacture. Further the rotation of the spring requires a large space in the receiving chamber of the module.

SUMMARY OF THE INVENTION

Therefore, it is the object of the invention to provide the simplified and safe fastening of an airbag module with the aid of a spring element which requires little space and low efforts for assembling the module.

This object is achieved by a device comprising the features of claim 1. Advantageous and expedient configurations of the device according to the invention are described in the sub-claims.

The device for fastening an airbag module in a vehicle according to the invention comprises a first part, especially a steering wheel insert including a latching hook as well as a second part, especially a base plate of the airbag module including a passage opening for the latching hook and a holder for a spring element. The device further comprises a spring element including a bearing section and an elastically deflectable retaining section. The spring element is held in the holder such that the retaining section can be transferred from a starting position to a deflecting position which permits the latching hook to be guided through the passage opening and into a retaining position in which the retaining section presses against a retaining surface of the latching hook. The bearing section, on the other hand, is held substantially immovably in the holder. By "immovably" it is meant in this context that the bearing section of the spring element is neither displaced, nor rotated or deflected when the latching hook is guided through.

Due to the immovable bearing of the bearing section the spring element adopts a defined position in the device according to the invention and maintains the same during the entire fastening operation. Merely the retaining section is deflected relative to the bearing section, but the position of the spring element on the second part per se remains unchanged. In this way the risk of jamming of the spring element or of faulty assembly is minimized.

An especially compact design of the spring element ensues from a substantially U-shaped configuration of the spring element made of flat steel having a base connecting the bearing section and the retaining section, the retaining section facing the bearing section and preferably being adapted to be deflected toward the bearing section when the latching hook is guided through the passage opening.

According to a preferred embodiment of the fastening device according to the invention, the spring element can be inserted in the holder starting with the base up to a stop. This results in a very simple and convenient pre-assembly of the spring element to the second part of the fastening device. Due to the noticeable abutting against the stop the risk of incomplete insertion of the spring element during pre-assembly is reduced.

An advantageous configuration of the spring element provides that the spring element is tapered toward the base, with the retaining section and the bearing section extending from a base of the spring element so that the distance between the retaining section and the bearing section increases with a growing distance from the base.

The advantage of the afore-mentioned configuration of the spring element is most clearly expressed in combination with a configuration of the holder adapted thereto in which lateral contact surfaces of the holder in the inserting direction of the spring element on the whole form a stronger tapering than that of the spring element. Such a design automatically attains biasing of the spring element already by inserting the spring element.

In the case of a shape of the spring element adapted to the course of the outer edge of base plate of an airbag module the retaining section includes a first retaining segment extending from a base of the spring element and a second retaining segment extending from the first retaining segment at an obtuse angle, the second retaining segment acting on the latching hook.

For reinforcing the retaining segment of the spring element a configuration in which at least the second retaining segment has a C-shaped cross-section is advantageous. This can significantly increase the holding force of the fastening device according to the invention as regards the load occurring upon activation of the airbag module. The C-shaped cross-section of the second retaining segment provides for better transmission of force from the spring element into the latching hook because of the enlarged contact surface.

It is especially preferred that an upper and/or a lower wing section extend substantially in parallel to each other and/or normal to a wall of the second retaining segment facing the bearing section, especially toward the bearing section, and/or are connected to an upper and/or lower edge of the wall of the second retaining segment to form the C-shaped cross-section.

In particular the configuration of the C-shaped cross-section is advantageous to the option to manufacture the spring of flat metal, especially a (resilient) sheet metal, because the torsional stiffness of the spring in the area of the second retaining segment is increased even beyond the degree of a conventional spring having a round cross-section and an identical cross-sectional area.

Also an L-shaped cross-section is imaginable instead of the C-shaped cross-section.

Preferably also the bearing section has a first bearing segment extending from a base of the spring element and a second bearing segment extending from the first bearing segment at an obtuse angle.

It is further preferred that the spring element is configured in such manner that the obtuse angle between a first bearing segment and a second bearing segment extending therefrom is substantially equal to an obtuse angle formed between a first retaining segment and a second retaining segment extending therefrom.

Preferably a spring element according to the invention for the device is configured so that a first bearing segment arranged more closely to the base is shorter than a second bearing segment extending therefrom and/or that a first retaining segment arranged more closely to the base is shorter than a second retaining segment extending therefrom.

Preferably a spring element according to the invention for the device is also configured so that a first bearing segment arranged adjacent to the base is longer than a first retaining segment arranged adjacent to the base and/or that a second bearing segment formed distant from the base is shorter than a second retaining section formed distant from the base which preferably has a C-shaped cross-section.

In this way it is possible according to the invention to provide a spring element and a fastening device that allows safe holding and easy insertion of the module into the module acceptance. Thus also requirements of customers to the ease of fitting can be met.

In accordance with an especially preferred embodiment of the fastening device according to the invention, the latching hook has a working surface arranged such that when the latching hook is guided through the passage opening it obliquely impinges on the retaining section of the spring element such that a free end of the retaining section is deflected more strongly than the other areas of the retaining section. Since the free rear end of the retaining section being farther spaced apart from the bearing section can be more easily deflected that a front area of the retaining section close to the base, the force required for deflection is relatively low even if the spring element on the whole is very stiff as regards a deflection of the retaining section. The efficient conversion of force obtained in this way minimizes the effort required to attach the second part onto the first part of the fastening device whereby the assembly is rendered very convenient.

BRIEF DESCRIPTION OF THE DRAWINGS

Further features and advantages of the invention will be evident from the following description and from the attached drawings which are referred to, illustrating in.

DESCRIPTION

Figure 1:
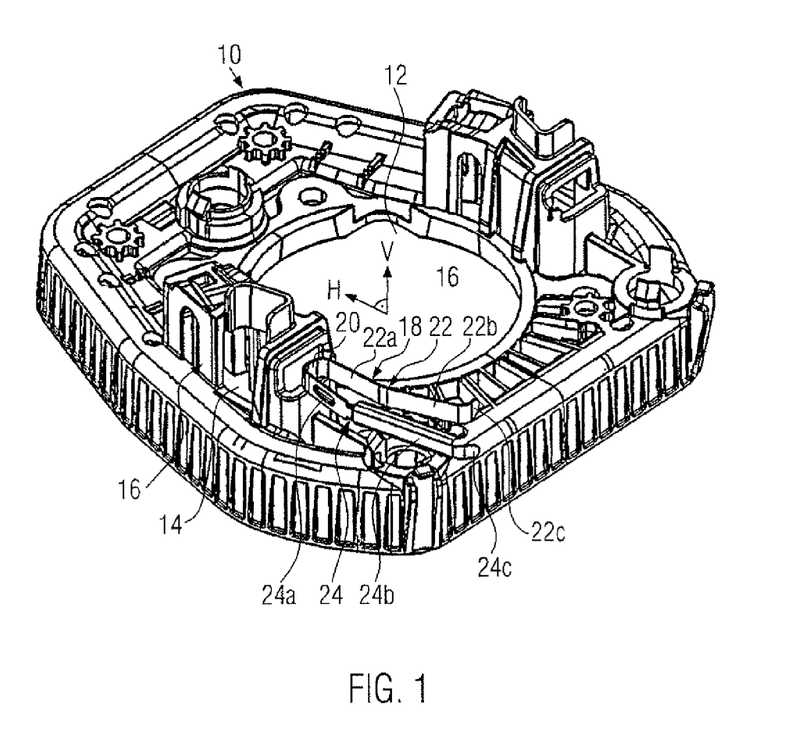
FIG. 1 a perspective bottom view of a subunit adapted to be preassembled of the fastening device according to the invention comprising a base plate and a spring element.
Figure 2:
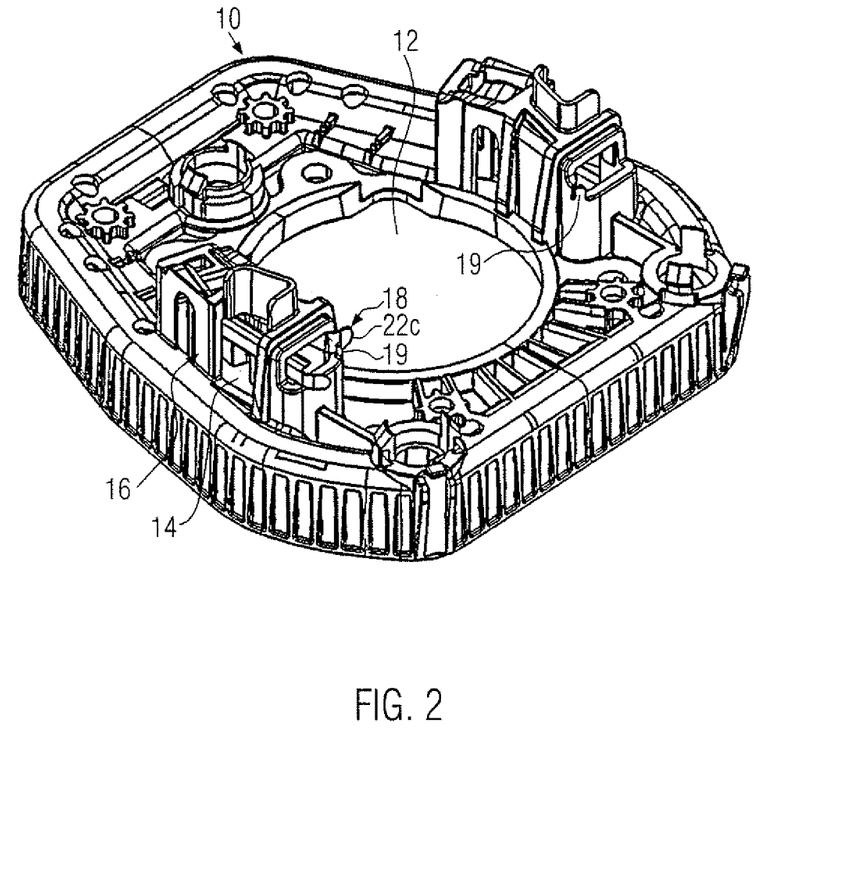
FIG. 2 a perspective bottom view of the subunit of FIG. 1 in the preassembled condition.
Figure 3:
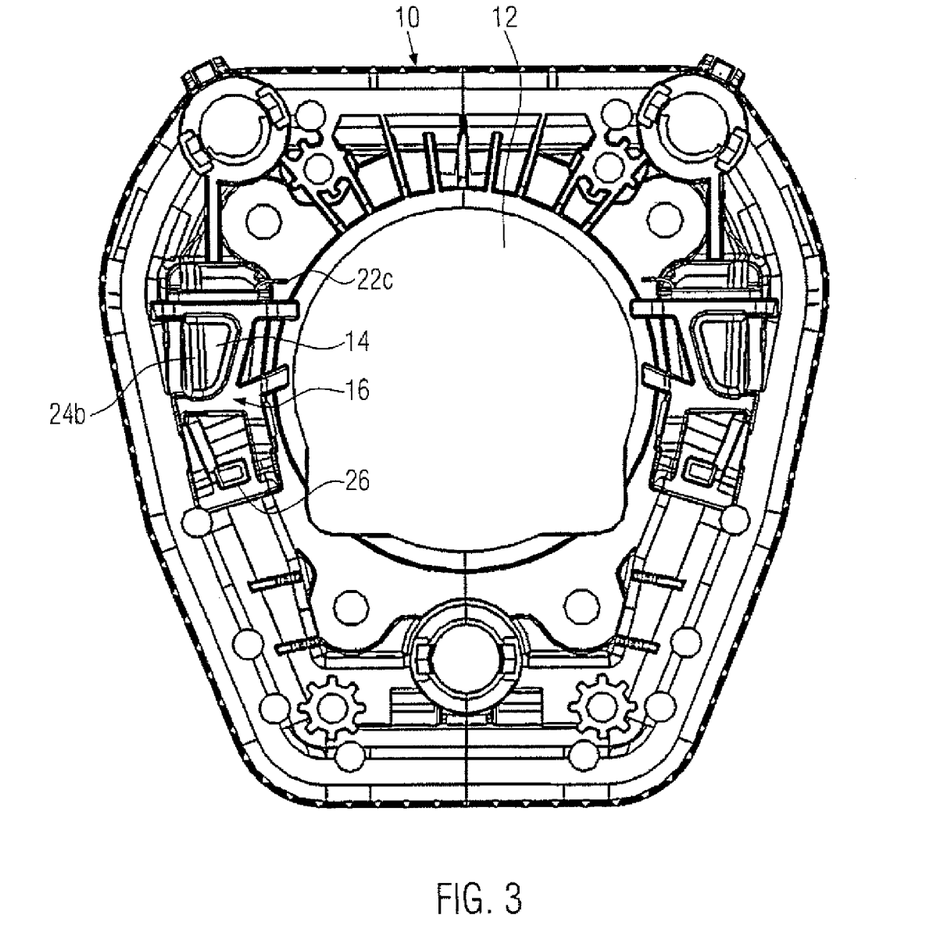
FIG. 3 a bottom view of the preassembled subunit.
Figure 4:
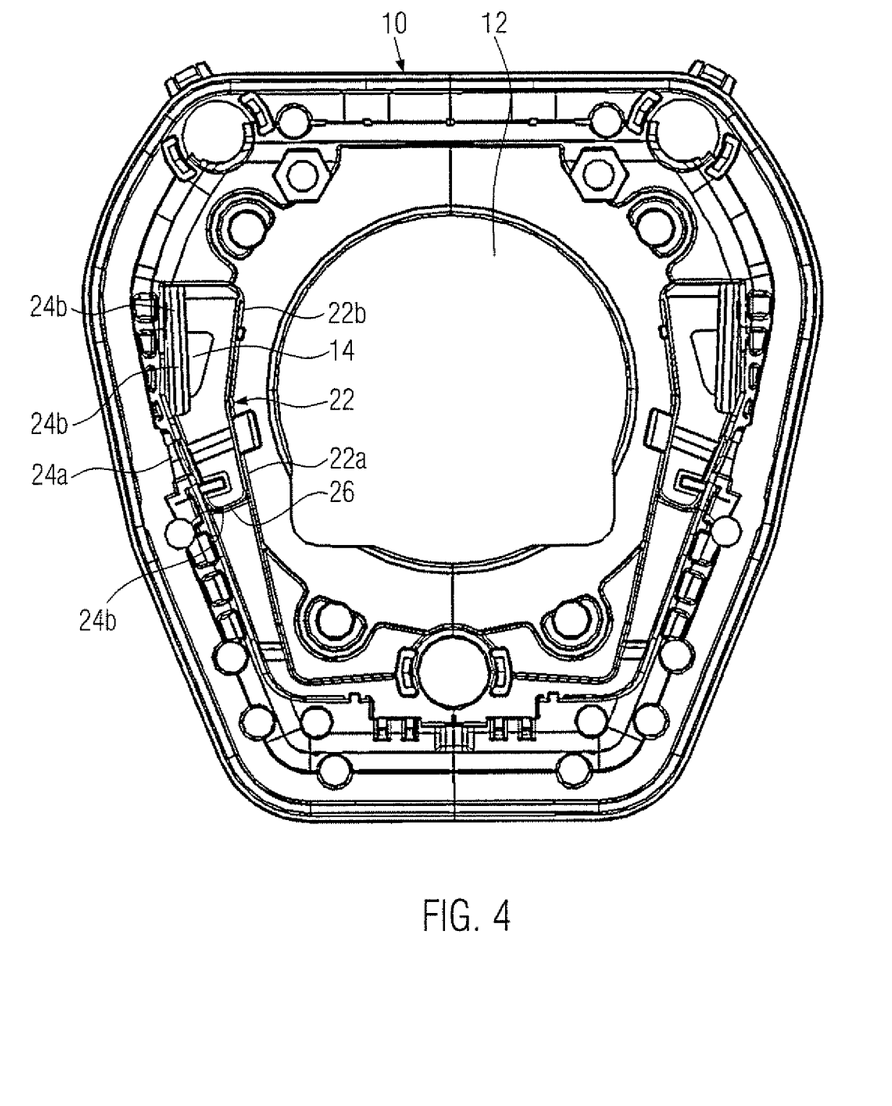
FIG. 4 a top view of the preassembled subunit.
Figure 5:
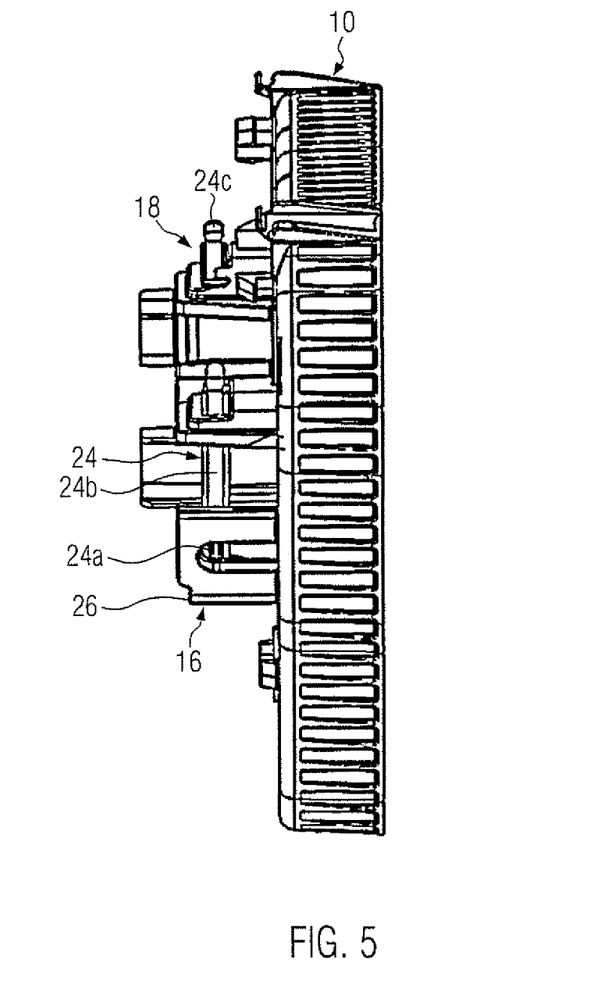
FIG. 5 a side view of the preassembled subunit.

In FIG. 1 a base plate 10 of an airbag module is shown on which substantial components of the airbag module (not shown here) such as the inflator, the airbag etc. are fastened. The airbag module is fastened by the base plate 10 in the vehicle, in particular to a steering wheel insert fitted in the steering wheel of the vehicle or formed especially integrally with the latter.

The base plate 10 has a substantially circular central opening 12 defining an axial direction. The axial direction is parallel to the fitting direction in which the base plate 10 is attached to the steering wheel insert and, according to the representation in FIG. 1, will hereinafter be referred to as vertical direction V, without any limiting meaning being attributed to this designation.

The base plate 10 has a passage opening 14 for a latching hook between its outer edge and the central opening 12. A holder 16 for a spring element is formed at the passage opening 14. Another passage opening 14 and another holder 16 are provided on the opposite side of the central opening 12.

FIG. 1 moreover illustrates a spring element 18 adapted to be inserted into the holder 16 in a horizontal fitting direction H so that the base plate 10 and the spring element 18 adopt a preassembled condition.

The spring element 18 is made of a flat piece of metal, preferably by cutting a blank and by chamfering individual sections thereof.

The thickness of the spring element (and/or of the flat piece of metal) is 0.2 to 0.6 mm, preferably 0.25 to 0.4 mm, especially 0.3 to 0.35 mm.

The spring element 18 is substantially U-shaped, the legs being preferably bent, in particular to a different extent.

From a base 20 each of a bearing section 22 and a retaining section 24 facing the former extend almost at right angles or opening slightly V-shaped. The distance between the retaining section 24 and the bearing section 22 continuously increases with a growing distance from the base 20, i.e. the spring element 18 is tapered toward the base 20.

Both the bearing section 22 and the retaining section 24 can be subdivided into segments. To a first bearing segment 22a extending from the base 20 a second bearing segment 22b is connected at an obtuse angle. The second bearing segment 22b opens into a more strongly bent bearing end segment 22c which marks a free rear end of the bearing section 22.

Corresponding to the bearing section 22, also the retaining section 24 is subdivided into a first retaining segment 24a, a second retaining segment 24b and a rear retaining end segment 24c, wherein the corresponding segments are substantially facing each other and the second bearing segment 22b and the second retaining segment 24b as well as the bearing end segment 22c and the retaining end segment 24c are bent in the same direction vis-à-vis each of the first bearing segment 22a and the first retaining segment 24a. Thus the bearing section 22 and the retaining section 24 are adapted to the course of the outer edge of the base plate 10.

Depending on the preferred embodiment, in the area of the holders 16 the base 10 includes one or more projections 19 in which the bearing end segment 22c (and/or the retaining end segment 24c) of the spring element 18 can be engaged to ensure a safe seat to protect the same against falling out of the accepting section 14 preferably in the form of a passage opening.

The entire spring element 18 has a substantially rectangular cross-section, the longer side of the rectangle extending—in the preassembled condition of the base plate 10 and of the spring element 18—in the vertical direction. An exception is constituted by the second retaining section 24 which in addition includes two substantially horizontally extending wings 24d, 24e and thus has a C-shaped cross-section.

Figure 10:
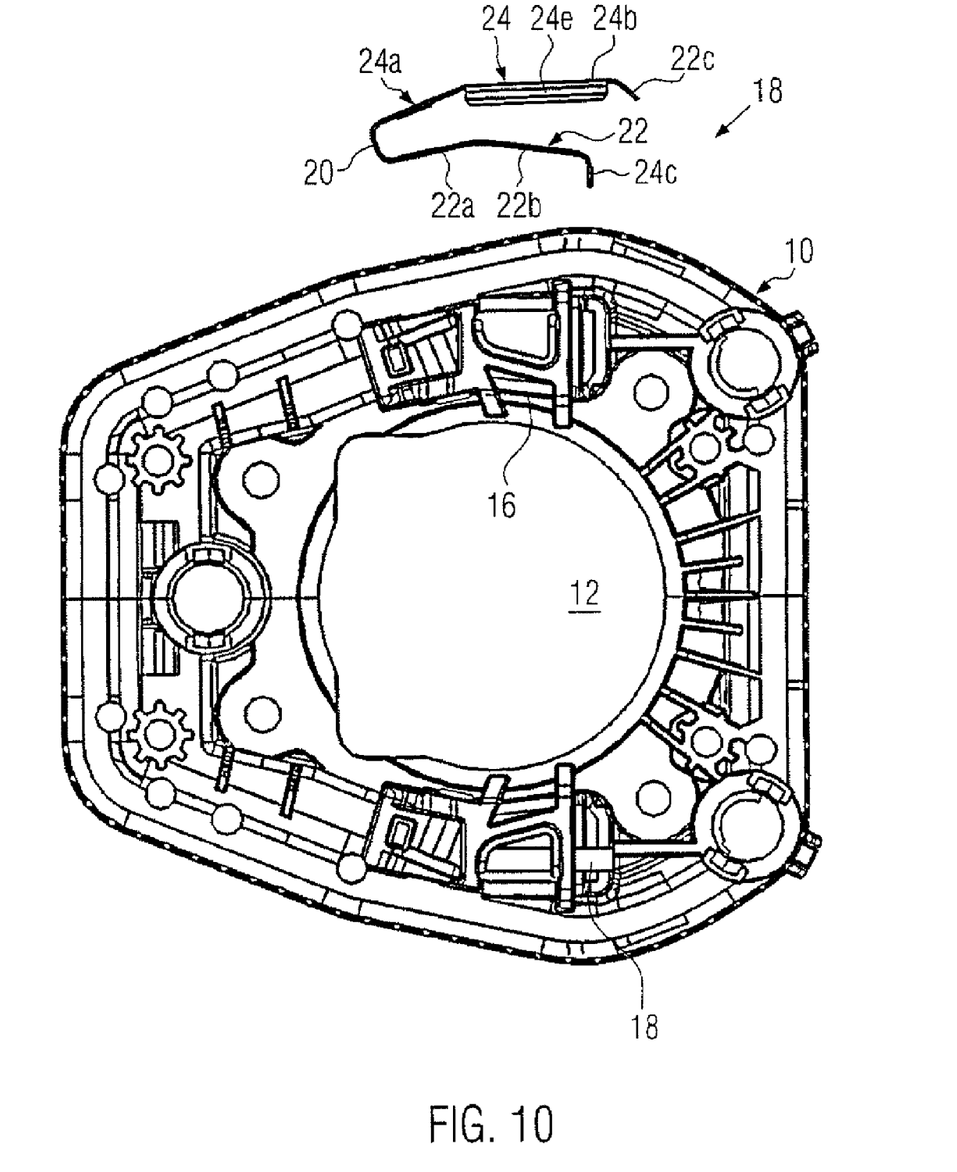
FIG. 10 a perspective detailed representation of a further embodiment of the fastening device according to the invention modified compared to FIG. 2 and of the spring element according to the invention.

Depending on the preferred embodiment (cf. FIG. 1 and FIG. 10) the finally bent spring has a length (measured from the base 20 to the retaining end segment 24c) of 40 to 60 mm, especially 45 to 50 mm.

Depending on the preferred embodiment (cf. FIG. 1 and FIG. 10) the finally bent spring has a width of 15 to 40 mm, especially 20 to 30 mm, in the area of its end segments 22c, 24c in the not yet inserted condition (V-shape slightly opening from the base).

Depending on the preferred embodiment (cf. FIG. 1 and FIG. 10), in the area of its base and bearing sections 20, 22 the finally bent spring has a height of 3 to 6 mm, especially 4 to 5 mm and/or in the area of its C-shaped bearing section it has a corresponding height or a height of 3 to 7 mm, especially 4 to 6 mm.

The holder 16 includes plural holding sections and lateral contact surfaces that will be described in detail in the following. The spring element 18 is inserted in the holder 16 starting with the base 20 in the horizontal direction H up to the point when the base 20 abuts against a stop 26. The FIGS. 2 to 6 show the base plate 10 and the spring element 18 in the preassembled condition in which the spring element 18 is completely inserted in the holder 16 and adopts a starting position.

Horizontal holding sections provide for fixing the spring element 18 in both vertical directions. The entirety of the lateral vertical contact surfaces of the holder 16 exhibits a stronger tapering in the inserting direction H than that of the spring element 18. Thus automatically a bias is built up when the spring element 18 is inserted in the holder 16.

Figure 6:
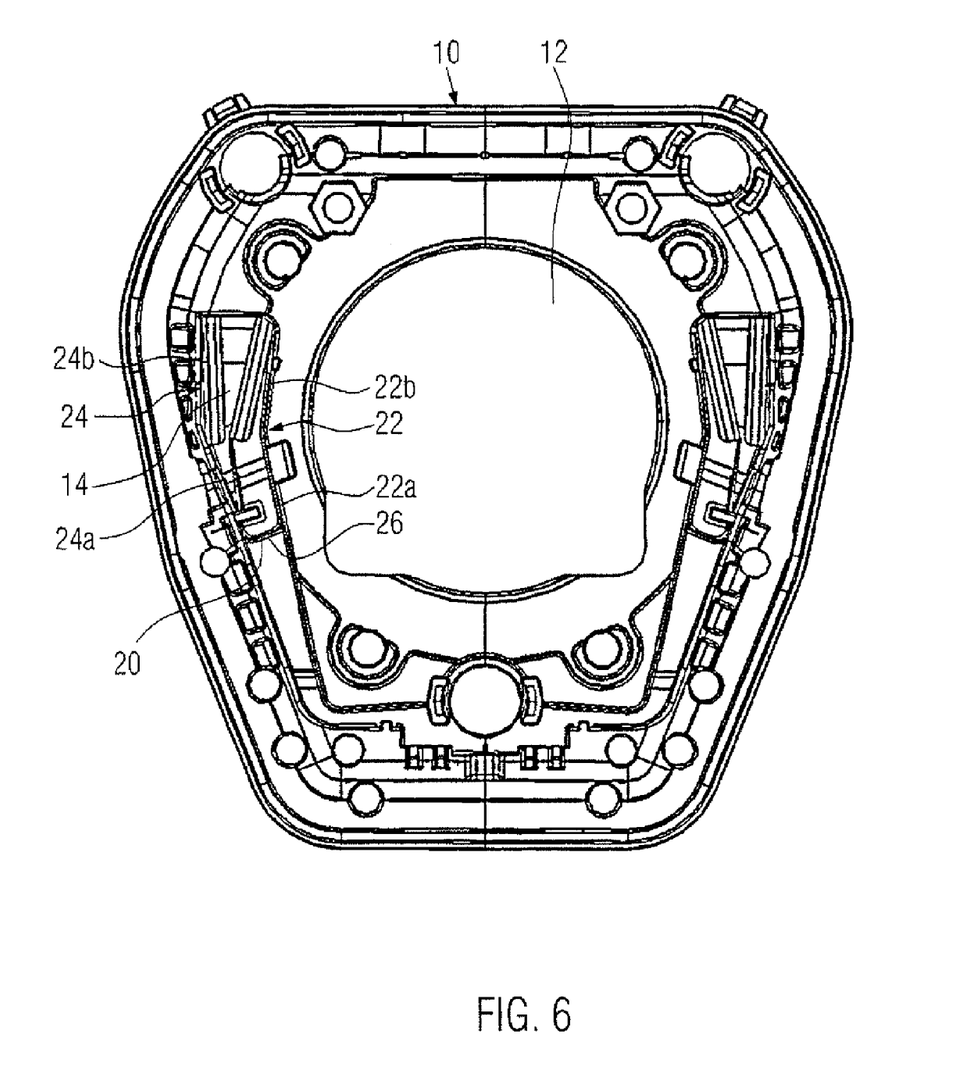
FIG. 6 a top view of the subunit according to the invention with different positions of the spring element.

The vertical contact surfaces which are laterally contacted by the bearing section 22 and the retaining section 24 ensure that the bearing section 22 cannot be deflected toward the central opening 12 and the retaining section 24 cannot be deflected in the opposite direction. However, an elastic horizontal deflection of the retaining section 24 toward the bearing section 22 is possible. FIG. 6 illustrates the maximum possible deflection of the retaining section 24 at which the retaining section 24 abuts against the bearing section 22. This position indicated in FIG. 7 will hereinafter be referred to as deflecting position.

Figure 7:
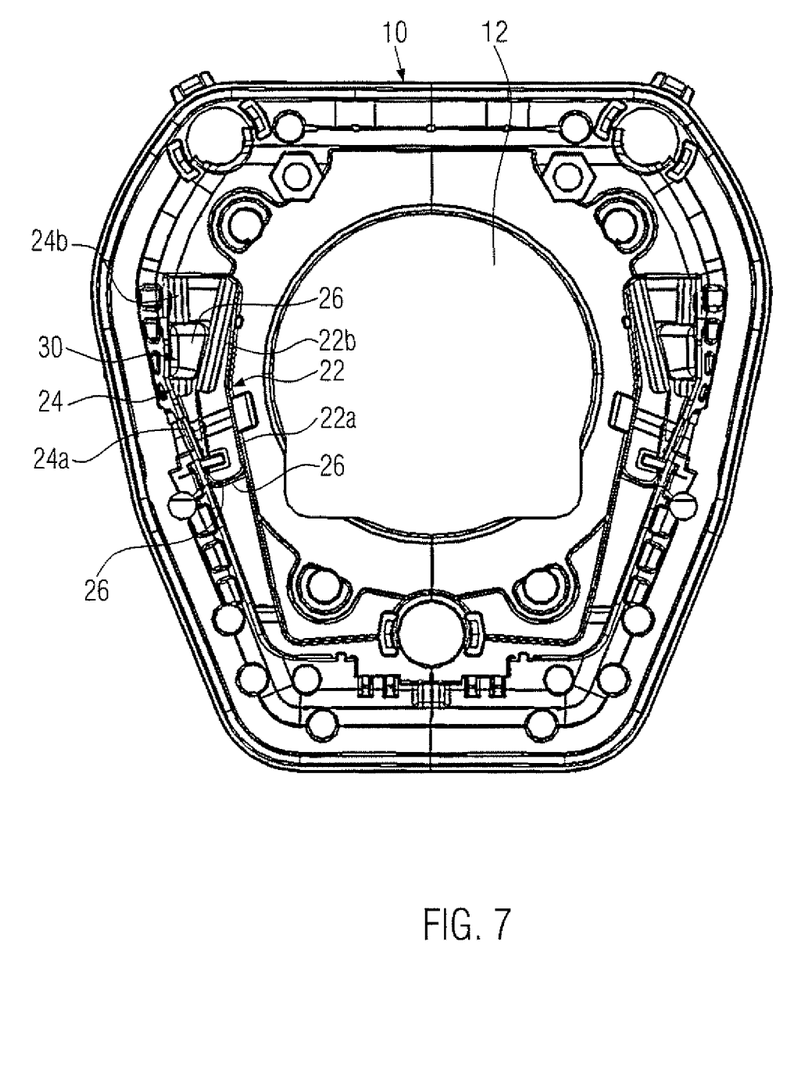
FIG. 7 a top view of the fastening device according to the invention with different positions of the spring element.
Figure 8:
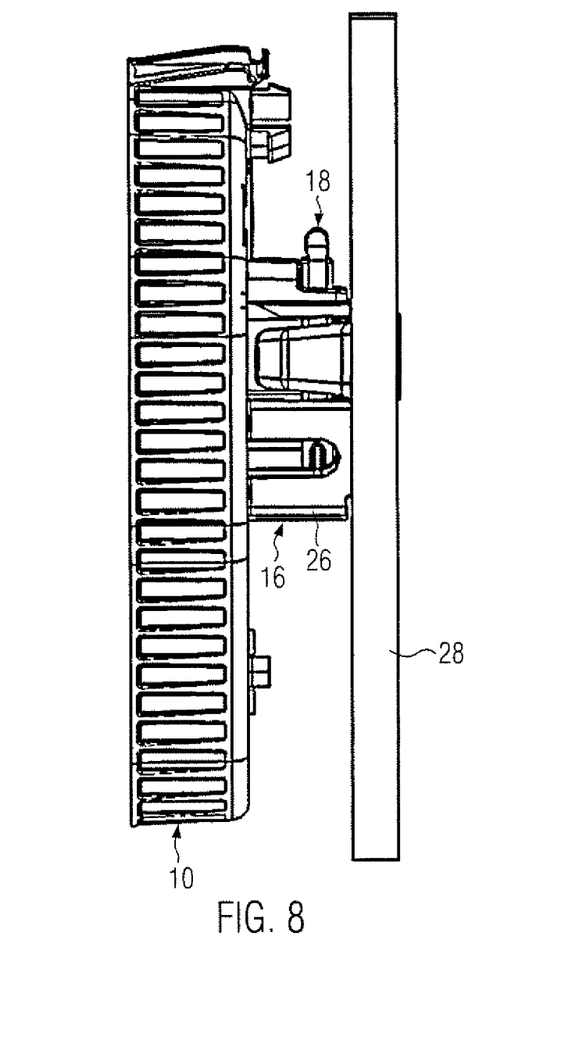
FIG. 8 a side view of the fastening device according to the invention.
Figure 9:
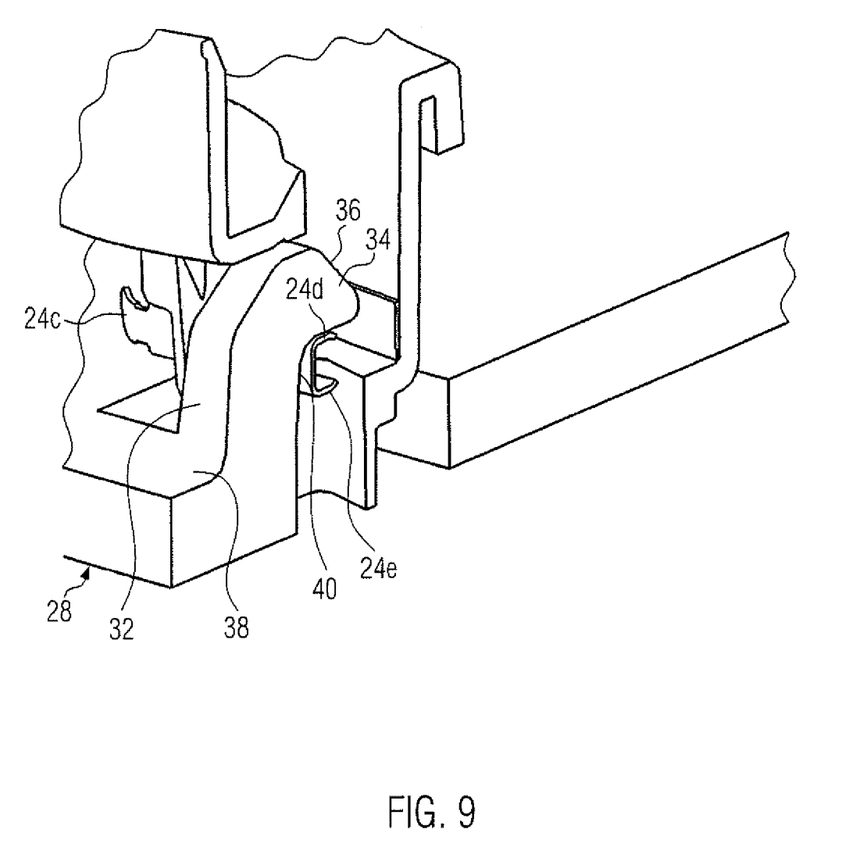
FIG. 9 a perspective detailed representation of the fastening device according to the invention.

FIGS. 7 to 9 illustrate the fastening device in the finally assembled state in which the base plate 10 is fastened to an insert 28 of a vehicle steering wheel. The steering wheel insert 28 is shown in a simplified manner as a plate from which latching hooks 30 are projecting. The latching hooks 30 include a base section 32 and a protruding lug 34 having a working surface 36 that is neither parallel nor normal to the horizontal plane (which in turn is oriented normal to the vertical direction V). The interaction between the spring element 18 and the latching hook 30 is equal for all pairs.

In order to fasten the airbag module on the steering wheel insert 28 the base plate 10 is attached onto the steering wheel insert 28 in the vertical direction V so that the latching hook 30 is guided through the passage opening 14. The working surface 36 then impinges on the retaining section 24, more exactly speaking on the reinforced second retaining segment 24b. When the latching hook 30 is further guided through, the lug 34 of the latching hook 30 deflects the retaining section 24 in the horizontal direction so far that latching hook 30 slides past the spring element 18. This position indicated in FIG. 7 substantially corresponds to the deflecting position already indicated in FIG. 6.

For facilitating the retaining section 24 the working surface 36 of the lug 34 is inclined so that the distance of the working surface 36 from the base section 32 decreases with a growing distance from a base surface 38 from which the latching hook 30 is extending. Moreover, at a rear end the working surface 36 is wider than at a front end. This design of the working surface 36 results in the fact that the free rear end of the retaining section 24 is deflected more strongly when guiding through the latching hook 30 than the other areas of the retaining section 24, as is evident from the representation of FIG. 7.

As soon as the lug 34 has passed the retaining section 24, the retaining section 24 springs back from the deflecting position in the horizontal direction until, while being biased, it contacts a retaining surface 40 of the latching hook 30. Hereinafter this position will be referred to as retaining position. The upper wing 24d of the C-shaped profile of the second retaining segment 24b ensures a large-area contact in the retaining position. On the whole, in the retaining position the spring element 18 withstands very high vertical withdrawing forces due to the stable C-shaped profile of the second retaining segment 24b.

After preassembly of the spring element 18 to the base plate 10 the bearing section 22 of the spring element 18 is held immovably in the holder during and after guiding the latching hook 30 through the passage opening 14 of the base plate 10, i.e. the bearing section 22 is neither displaced, nor rotated or deflected.

As a matter of course, also an inverse arrangement of the latching hook 30 and the spring element 18 is possible, i.e. the spring element 18 can also be held at the steering wheel insert 28 and the latching hook 30 can be provided at the base plate 10. Furthermore the airbag module need not absolutely be fastened to a steering wheel insert 28 by a base plate 10; rather, the spring element 18 and the latching hook 30 can also be arranged at a different component fixed to the vehicle or the steering wheel or airbag module component.

The invention claimed is:

1. A device for fastening an airbag module in a vehicle comprising
a first part, the first part being one of a steering wheel insert (28) and a base plate (10) of the air bag module, the first part including a latching hook (30),
a second part, the second part being the other of the steering wheel insert (28) and the base plate (10) of the airbag module, the second part including an acceptance (14) for the latching hook (30) and a holder (16) for a spring element (18),
the spring element (18) having a rectangular cross section including a bearing section (22) and an elastically deflectable retaining section (24),
wherein the spring element (18) is held in the holder (16) so that the retaining section (24) can be transferred from a starting position into a deflecting position which permits the latching hook (30) to be accepted in the acceptance (14) and into a retaining position in which the retaining section (24) presses against a retaining surface (40) of the latching hook (30),
wherein the bearing section (22) is held substantially immovably in the holder (16).

2. The device according to claim 1, wherein the spring element (18) is formed substantially in U-shape having a base (20) connecting the bearing section (22) and the retaining section (24), wherein the retaining section (24) faces the bearing section (22) and is deflectable toward the bearing section (22) when the latching hook (30) is guided through the passage opening (14).

3. The device according to claim 1, wherein the spring element (18) is adapted to be inserted into the holder (16) starting with the base (20) up to a stop (26).

4. The device according to claim 2, wherein the spring element (18) is tapered toward the base (20), wherein the retaining section (24) and the bearing section (22) extend from a base (20) of the spring element (18) such that the distance between the retaining section (24) and the bearing section (22) increases with a growing distance from the base (20).

5. A device for fastening an airbag module in a vehicle comprising:
a first part, the first part being one of a steering wheel insert (28) and a base plate (10) of the air bag module, the first part including a latching hook (30),
a second part, the second part being the other of the steering wheel insert (28) and the base plate (10) of the airbag module, the second part including an acceptance (14) for the latching hook (30) and a holder (16) for a spring element (18),
the spring element (18) formed of flat metal including a bearing section (22) and an elastically deflectable retaining section (24),
wherein the spring element (18) is held in the holder (16) so that the retaining section (24) can be transferred from a starting position into a deflecting position which permits the latching hook (30) to be accepted in the acceptance (14) and into a retaining position in which the retaining section (24) presses against a retaining surface (40) of the latching hook (30),
wherein the bearing section (22) is held substantially immovably in the holder (16),
wherein lateral contact surfaces of the holder (16) in the inserting direction of the spring element (18) on the whole constitute a stronger tapering than that of the spring element (18).

6. The device according to claim 2, wherein the retaining section (24) includes a first retaining segment (24a) extending from the base (20) and a second retaining segment (24b) extending from the first retaining segment (24a) which acts on the latching hook (30).

7. The device according to claim 6, wherein at least the second retaining segment (24b) has a C-shaped cross-section, wherein an upper and/or a lower wing segment (24d, 24e) extend substantially in parallel to each other and/or normal to a wall of the second retaining segment (24b) facing the bearing section (22), toward the bearing section, and/or are connected to an upper and/or a lower edge of the wall of the second retaining segment (24b) to form the C-shaped cross-section.

8. The device according to claim 2, wherein the bearing section (22) includes a first bearing segment (22a) extending from the base (20) and a second bearing segment (22b) extending from the first bearing segment (22a) at an obtuse angle.

9. The device according to claim 2, wherein the bearing section (22) includes a first bearing segment (22a) extending from the base (20) of the spring element (18) and a second bearing segment (22b) extending from the first bearing segment (22a) at an obtuse angle to which second bearing segment a bearing end segment (22c) bent in the same direction is connected.

10. The device according to claim 9, wherein the obtuse angle between a first bearing segment (22a) and a second bearing segment (22b) extending therefrom is substantially equal to an obtuse angle formed between a first retaining segment (24a) and a second retaining segment (24b) extending therefrom.

11. The device according to at claim 2, wherein a first bearing segment (22a) arranged more closely to the base (20) is shorter than a second bearing segment (22b) extending there along and/or that a first retaining segment (24a) arranged more closely to the base (20) is shorter than a second retaining segment (24b) extending there along.

12. The device according to claim 2, wherein a first bearing segment (22a) arranged adjacent to the base (20) is longer than a first retaining segment (24a) arranged adjacent to the base (20) and/or that a second bearing segment (22b) formed distant from the base is shorter than a second retaining segment (24b) formed distant from the base which has a C-shaped cross-section.

13. A device for fastening an airbag module in a vehicle comprising:
a first part, the first part being one of a steering wheel insert (28) and a base plate (10) of the air bag module, the first part including a latching hook (30),
a second part, the second part being the other of the steering wheel insert (28) and the base plate (10) of the airbag module, the second part including an acceptance (14) for the latching hook (30) and a holder (16) for a spring element (18),
the spring element (18) formed of flat metal including a bearing section (22) and an elastically deflectable retaining section (24),
wherein the spring element (18) is held in the holder (16) so that the retaining section (24) can be transferred from a starting position into a deflecting position which permits the latching hook (30) to be accepted in the acceptance (14) and into a retaining position in which the retaining section (24) presses against a retaining surface (40) of the latching hook (30),
wherein the bearing section (22) is held substantially immovably in the holder (16), wherein the latching hook (30) includes a working surface (36) arranged in such way that it impinges obliquely on the retaining section (24) of the spring element (18) when the latching hook (30) is guided through the passage opening (14) so that a free end of the retaining section (24) is deflected more strongly than the other areas of the retaining section (24).

* * * * *